US010383059B2

United States Patent
Lei et al.

(10) Patent No.: US 10,383,059 B2
(45) Date of Patent: Aug. 13, 2019

(54) VEHICLE TELEMATICS UNIT POWER MANAGEMENT

(71) Applicants: General Motors LLC, Detroit, MI (US); GM Global Technology Operations LLC, Detroit, MI (US)

(72) Inventors: Yao Hui Lei, Windsor (CA); Ronald R. Terry, Clarkston, MI (US); Dipankar Pal, Sylvania, OH (US); Esayas Naizghi, Warren, MI (US); Andrew J. Macdonald, Grosse Pointe Park, MI (US)

(73) Assignees: General Motors LLC, Detroit, MI (US); GM Global Technology Operations LLC, Detroit, MI (US)

( * ) Notice: Subject to any disclaimer, the term of this patent is extended or adjusted under 35 U.S.C. 154(b) by 206 days.

(21) Appl. No.: 14/286,595

(22) Filed: May 23, 2014

(65) Prior Publication Data
US 2015/0341862 A1 Nov. 26, 2015

(51) Int. Cl.
*H04W 52/02* (2009.01)

(52) U.S. Cl.
CPC .... *H04W 52/0241* (2013.01); *H04W 52/0254* (2013.01); *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/23* (2018.01); *Y02D 70/24* (2018.01)

(58) Field of Classification Search
None
See application file for complete search history.

(56) References Cited

U.S. PATENT DOCUMENTS

| | | | | |
|---|---|---|---|---|
| 5,712,795 A * | 1/1998 | Layman | ............... | A61M 5/142 307/64 |
| 8,514,825 B1 * | 8/2013 | Addepalli | ............. | H04W 4/046 370/338 |
| 8,989,954 B1 * | 3/2015 | Addepalli | ............. | H04W 4/046 370/328 |
| 2003/0104849 A1 * | 6/2003 | Arimitsu | ........... | H04W 52/0261 455/574 |
| 2004/0198466 A1 * | 10/2004 | Walby | ................... | G06F 1/3209 455/574 |
| 2004/0203767 A1 * | 10/2004 | Fraser | .................. | H04W 60/02 455/435.1 |
| 2005/0143146 A1 * | 6/2005 | Kim | ................. | H04W 52/0216 455/574 |
| 2006/0091996 A1 * | 5/2006 | Conner | .................. | B60C 23/04 340/5.64 |
| 2009/0067850 A1 * | 3/2009 | Mizutani | ............... | H04J 3/0605 398/154 |
| 2010/0035602 A1 * | 2/2010 | Doherty | ................ | H04W 48/16 455/425 |

(Continued)

*Primary Examiner* — Jeffrey M Rutkowski
*Assistant Examiner* — Mehedi S Aley
(74) *Attorney, Agent, or Firm* — Reising Ethington P.C.; David Willoughby

(57) ABSTRACT

A system and method of power management of a telematics unit in a vehicle is provided. An exemplary method includes determining that the vehicle is unpowered; determining that the vehicle is in a fringe region of a cellular network; and based the determining steps, entering a power-saving mode at the telematics unit.

19 Claims, 3 Drawing Sheets

(56) References Cited

U.S. PATENT DOCUMENTS

| | | | | |
|---|---|---|---|---|
| 2010/0054210 | A1* | 3/2010 | Ostergren | H04W 48/18 370/332 |
| 2013/0059575 | A1* | 3/2013 | Oesterling | H04W 4/046 455/422.1 |
| 2013/0344873 | A1* | 12/2013 | Sane | H04W 36/30 455/437 |
| 2014/0080505 | A1* | 3/2014 | Vannucci | G01S 5/0205 455/456.1 |
| 2014/0099970 | A1* | 4/2014 | Siomina | G01S 19/49 455/456.1 |
| 2015/0134723 | A1* | 5/2015 | Kansal | H04L 67/1031 709/203 |
| 2015/0264649 | A1* | 9/2015 | Pandya | H04W 52/0261 701/36 |
| 2016/0165540 | A1* | 6/2016 | Kokovidis | H04L 67/12 455/67.11 |

* cited by examiner

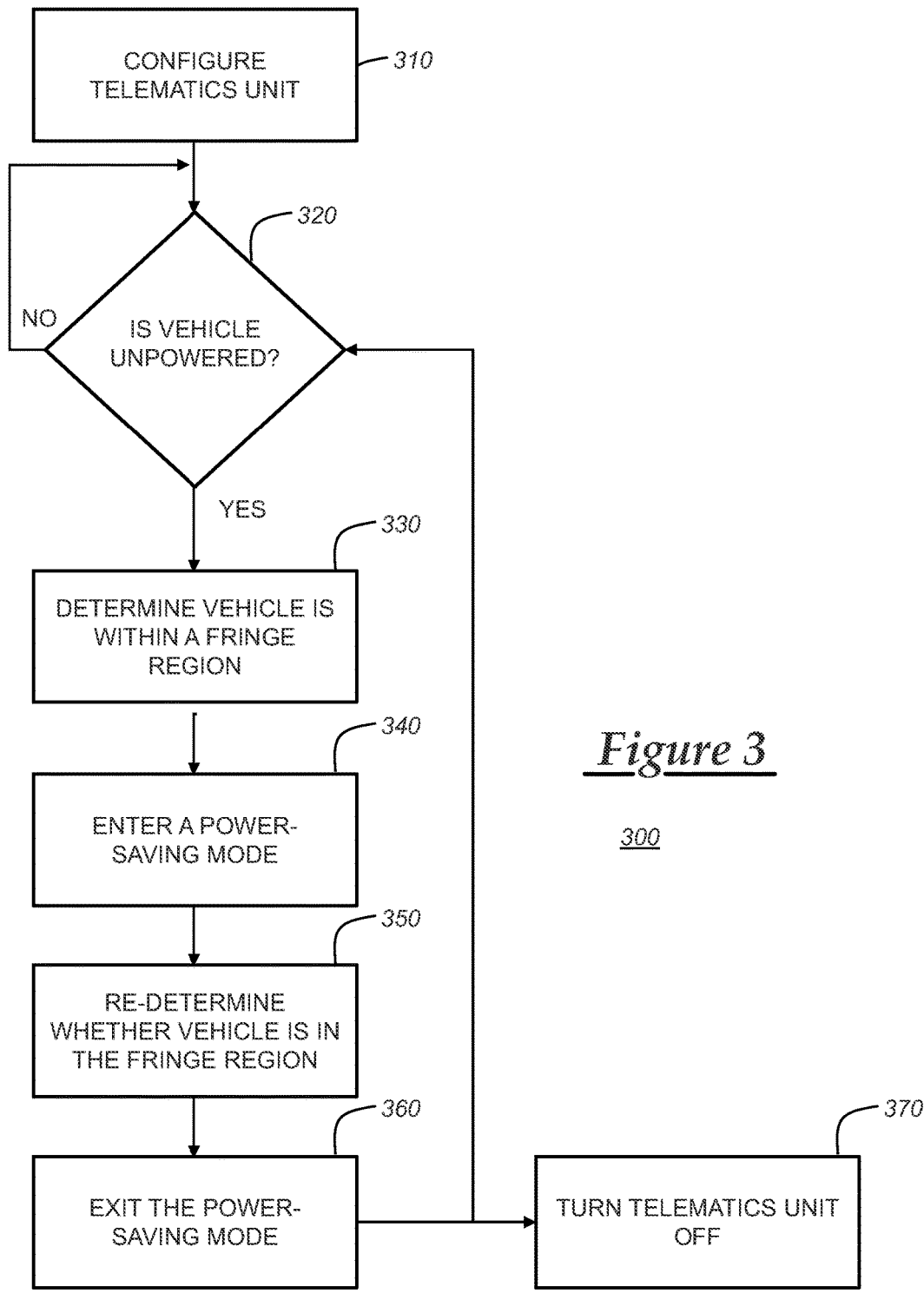

VEHICLE TELEMATICS UNIT POWER MANAGEMENT

TECHNICAL FIELD

The present invention relates to power management of a vehicle telematics unit.

BACKGROUND

Various vehicle systems may consume vehicle power when a vehicle is powered off. Devices operative by a vehicle user include the entertainment system and interior and exterior vehicle lighting. Other devices may consume power which are more transparent to the user's awareness such as a vehicle's global positioning satellite (GPS) device or a vehicle telematics device. Typically, such devices draw current from power stored in the vehicle battery when the vehicle is powered down.

SUMMARY

According to an embodiment of the invention, there is provided a method of power management of a telematics unit in a vehicle that includes the steps of: determining that the vehicle is unpowered; determining that the vehicle is in a fringe region of a cellular network; and based on the determining steps, entering a power-saving mode at the telematics unit.

According to another embodiment of the invention, there is provided a computer program product for a vehicle telematics unit. The product includes a non-transitory computer readable medium associated with a telematics unit having a network access device (NAD) that has one or more software application programs stored on the computer readable medium that includes instructions to: identify instances when the vehicle is in an unpowered state; determine that the wireless signal received by the NAD is a fringe-signal; and, based on the identify and determine instructions, modify a listening mode of the NAD to limit the power consumed by the telematics unit so that the telematics unit may be intermittently powerable throughout the duration of a predetermined vehicle power budget.

BRIEF DESCRIPTION OF THE DRAWINGS

One or more embodiments of the invention will hereinafter be described in conjunction with the appended drawings, wherein like designations denote like elements, and wherein:

FIG. 3 is a flowchart illustrating one example of a method using the system shown in FIG. 1.

DETAILED DESCRIPTION OF THE ILLUSTRATED EMBODIMENT(S)

The system and method described below generally pertain to preserving vehicle battery power during telecommunication operations performed when the vehicle is without recharging power. More specifically, the method pertains to minimizing power consumption of a vehicle telematics unit when the powered-off vehicle receives a weak network signal and attempts to respond to that signal. Thus, the telematics unit is capable of staying within a predetermined power budget when a network signal is strong or when it is absent. However, when the network signal is weak or intermittent, the telematics unit may exceed its power budget due to preconfigured listening and/or scanning periodicities when the unit connects or camps on an acquired network, then is disconnected due to the weakness (or loss) of the signal, and then attempts to reconnect. Repetitive connecting and reconnecting may consume approximately ten times the amount of power that the telematics unit consumes in the presence of a strong network signal. Where the power budget is exceeded, the battery may drain excessively, e.g., making the vehicle difficult or impossible to start at a later time.

It will be appreciated that when the vehicle is powered, communicating in the presence of a weak or intermittent network signal may have little effect on the vehicle's battery drain—i.e., when the vehicle is powered, the battery may be constantly re-charging (e.g., via the vehicle's alternator). A method is described below using a communications system that enables the vehicle to stay within its power budget regardless of whether the network signal is weak, strong, or absent. The description of the method follows a description of the system and operating environment.

Communications System

Figure 1:
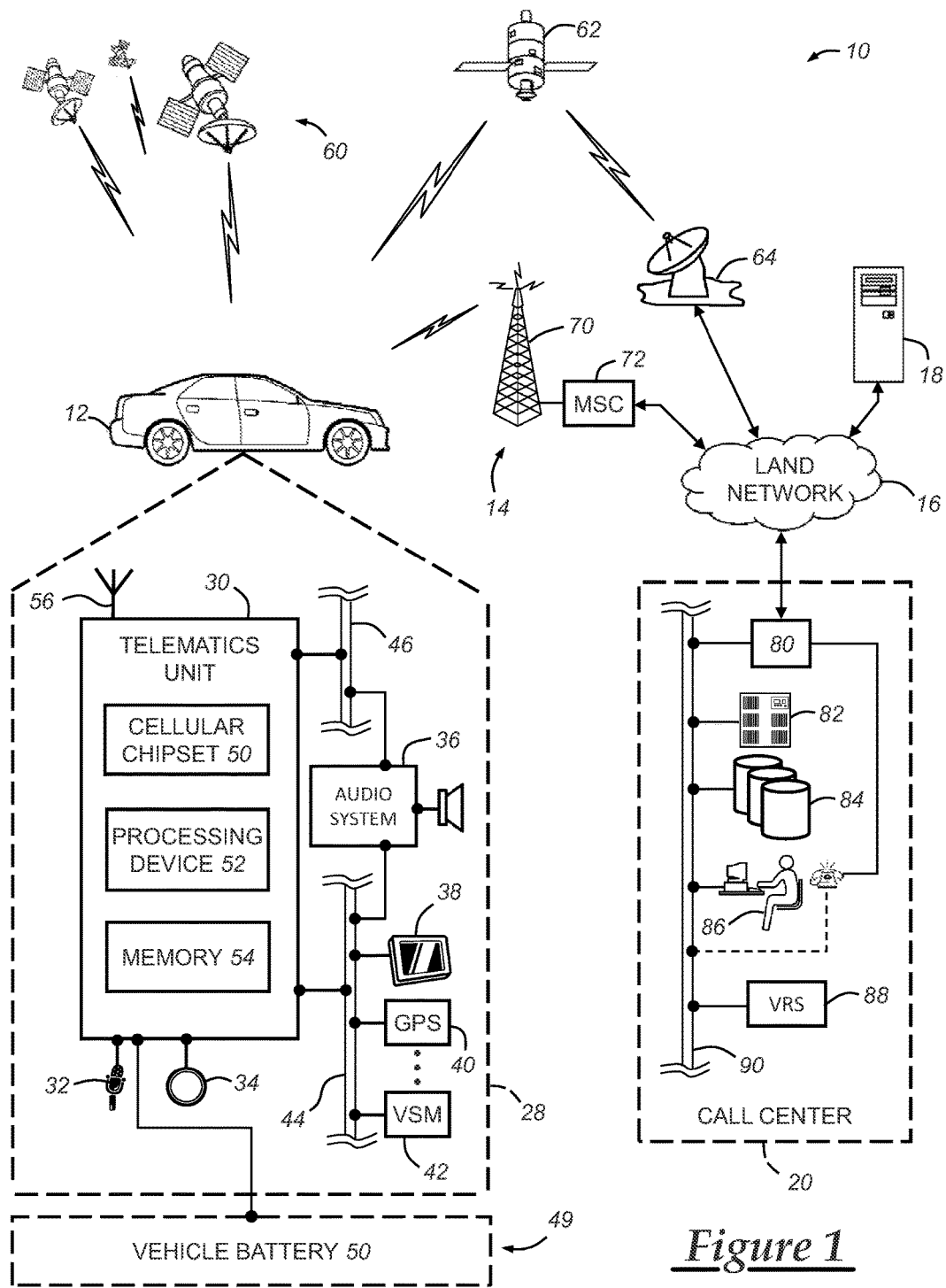
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 may have an electrical power system 49 that includes conventional components such as a battery 50, an alternator (not shown), wiring harnesses, etc. The battery 50 is shown coupled to the telematics unit 30 (e.g., via a wire harness) and may be configured to provide power to it (and other components and systems) both when the vehicle is powered or unpowered, as will be described in greater detail below.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset or network access device (NAD) 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

According to another embodiment, telematics unit 30 utilizes cellular communication according to one or more Long-Term Evolution (LTE) standards (e.g., LTE, Advanced-LTE, etc.); and, for example, the NAD 50 is configured for LTE communication.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites.

From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

The wireless carrier system 14 may be utilized by one or more wireless service providers, e.g., each service provider may support one or more different wireless networks, and each wireless network may be hosted by the wireless carrier(s) 14, the land network 16, the computer(s) 18, etc.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method

The vehicle 12 and its telematics unit 30 in the previously described operating environment may be used carry out one or more of the illustrative methods described below. At times, the vehicle may be unpowered or OFF and still maintain communication with a wireless network or wireless service provider. In such instances, it may be desirable to minimize power consumption or power draw on the battery 50 to use power less than or equal to a vehicle power budget. For example, the battery 50 may not be in a state of continuous recharging (e.g., as it may be when the vehicle is powered or ON). Telematics unit 30 may have a listening mode (e.g., operable according to various communication protocols such as CDMA, GSM, and/or LTE) to enable low-power consumption when the vehicle is unpowered. One example of a listening mode includes discontinuous reception (DRx) or a DRx listening mode. While the vehicle 12 is unpowered, the NAD 50 generally may be in a low-power sleep mode—waking up from the sleep mode periodically to listen for (or receive) information from the wireless network. Additionally, other vehicle electronic components may power down as well when the NAD is in the listening mode thereby further conserving vehicle battery power. For example, within an illustrative 200 millisecond (ms) time cycle (T), a listening portion (L) may be 10 ms (e.g., 5% listening and 95% sleeping, or a ratio of 1:20). Of course, values of the listening portions and sleeping portions may vary largely; e.g., the listening portion (T) may be 1 ms-200 ms of the total time cycle (T) may be 40 ms-1280 ms—thus, providing a wide variety of possible ratios (L:T). In the example above of L=10 ms and T=200 ms, the vehicle 12 may stay within its power budget, as described below.

Vehicle power budgets may vary; e.g., depending on vehicle demands or features, battery Amp-hours, etc. And a telematics unit power budget may be a portion of the vehicle power budget and may be configured, at least partially, based on the characteristics of the telematics unit itself.

An example of a vehicle telematics unit power budget is described herein; however, it should be appreciated that this power budget is merely one example and other budgets may have other parameters and parameter values. Thus, according to one example, a predetermined telematics unit power budget may include a power parameter (e.g., in milli-Amp-hours (mAh)) and a time parameter (e.g., in hours (h)), defining how long the value of the power parameter must last, if necessary). In one example, the power parameter is 1440 mAh and the time parameter is 240 h (or 10 days). Thus, when the vehicle is OFF, the telematics unit must expend less than or equal to 1440 mAh over a time period of 240 h—beginning at the time the vehicle is turned OFF. If the vehicle 12 is turned ON prior to the expiration of the time period and then is subsequently turned OFF again, the power budget parameters are reset; i.e., 1440 mAh may again be available over another period of 240 h. And in at least one implementation, when the power parameter or the time parameter expires (i.e., the 1440 mAh is consumed or the vehicle 12 is OFF for more than 240 h, the telematics unit 30 may cease to draw additional power from the battery 50). Referring again to the example above of the listening mode having a 10 ms listening portion (L) and a 200 ms time cycle (T)—this ratio applied to the illustrative power budget of 1440 mAh for a 10 day duration would equate to the NAD only expending 12 hours of listening portion over the 10 day period.

As described below, the vehicle power budget may be consumed while the vehicle is unpowered according to at least three scenarios or circumstances: a strong-signal scenario (or a scenario in which the signal strength or received signal strength indication (RSSI) is greater than a predetermined threshold), an extremely low-signal scenario (or a scenario in which the signal strength or RSSI is less than the predetermined threshold), and a fringe- or weak-signal scenario (or a scenario in which the signal strength or RSSI varies between values greater than and less than the predetermined threshold—e.g., is intermittently greater than the threshold and intermittently less than the threshold). In at least some embodiments, a strong-signal threshold may be greater than or equal to −107 dBm (LTE) [e.g., according to reference signal received power or RSRP—similar to RSSI], greater than or equal to −105 dBm (Wideband CDMA or WCDMA) [RSSI], or greater than or equal to −105 dBm (GSM) [RSSI].

As will be described below, in the presence of a strong-signal, the vehicle power budget may be maintained (e.g., the telematics unit 30 may consume less than or equal to 1440 mAh). In the extremely low-signal scenario (or no-signal scenario), the vehicle power budget may be maintained as well. However, in the fringe-signal scenario, the vehicle power budget may be consumed at a rate of up to ten times faster than nominal.

The fringe-signal scenario consumes more power than the other scenarios, in a sense, because the telematics unit 30 (e.g., the NAD) is confused about the signal strength. This is especially true when the strength of the signal varies from strong to extremely low. For example, in the extremely low-signal scenario, the NAD 50 periodically scans for an available network. A scan or scanning portion (S) requires more current (and more power) than a listening portion (L) of the same duration. This additional power consumption is mitigated because, as consecutive scans fail to find a network, the period between scans increases in order to reduce power drain and ultimately maintain the vehicle power budget. If the strong-signal has a no signal factor (NSF) of "1," then the extremely low-signal has an NSF of "2."

Thus, in the fringe-signal scenario, the power consumption may include periods of time where the NAD perceives an extremely low-signal strength and scans, as well as periods of time where the NAD perceives a stronger signal strength and enters the listening mode. Consider for example when the NAD first perceives the extremely low-signal strength—the NAD scans without finding a network to camp on. Then, the period between scans begins to increase in order to reduce power drain on the battery. Then, at least for a moment, the NAD discovers a strong or stronger signal— the NAD enters the listening mode. And then shortly thereafter, the signal strength again becomes extremely low again. The scan periodicity starts anew—i.e., being more frequent than it would have been had the NAD 50 not momentarily camped on the network (because of the discovered strong-signal). This pattern may repeat itself ultimately consuming ten times the normal amount power than a strong-signal scenario (e.g., an NSF of "10").

Figure 2:
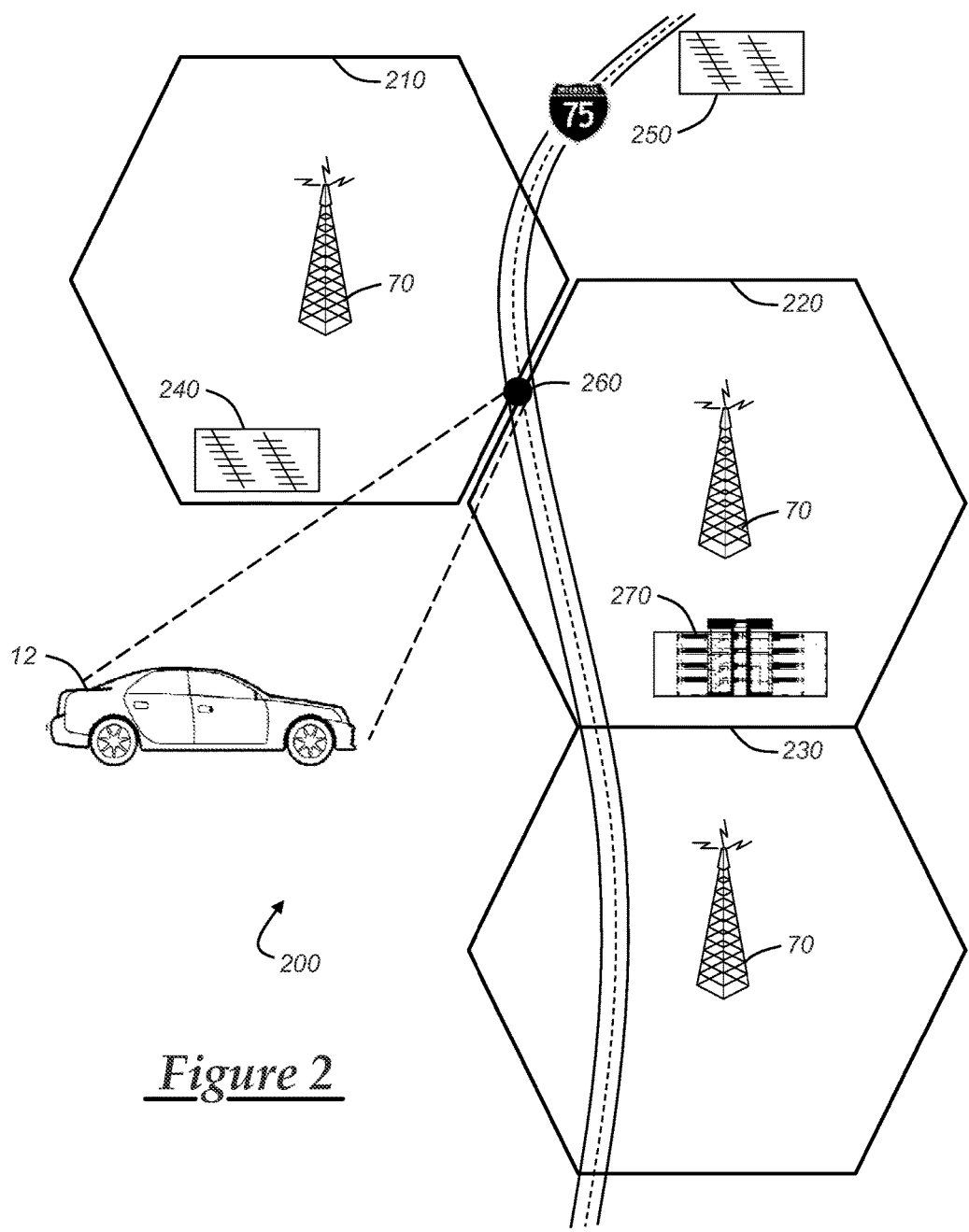
FIG. 2 is an example of an operating environment of the method disclosed herein.

FIG. 2 illustrates an operating environment 200 that illustrates the strong-signal scenario, the extremely low-signal scenario, and the fringe-signal scenario. The environment 200 has several cellular regions or cells or regions of normal operation 210, 220, 230, where the telematics unit 30 may operate when the vehicle 12 is OFF. An example of the strong signal scenario includes an outdoor parking lot 240 shown in cell 210 where the vehicle may be parked and turned OFF. The telematics unit 30 may operate in a strong-signal mode—e.g., in the listening mode (e.g., a DRx mode)—and stay within a prescribed or predetermined power budget.

FIG. 2 also illustrates a region of extremely low-service; e.g., outside the cells 210, 220, 230. For example, if the vehicle 12 were parked in the parking lot 250 and turned OFF, the telematics unit 30 may operate according to an extremely low-signal mode.

FIG. 2 also illustrates a couple of examples of a fringe region having a fringe-signal; e.g., at or near the outer edges of a cell (260) or within the cell but obstructed from some portion of the cellular signal that is significant or substantial enough to reduce the signal strength magnitude so that, when it reaches the telematics unit, the signal strength is weakened. One example of such an obstruction could be an indoor parking garage 270.

Thus, the telematics unit 30 may be configured to identify the telematics unit 30 operation when the vehicle is unpowered and in a fringe region (such as 260 or 270) and control the power consumption in order to maintain the vehicle's power budget, as will be described by the method below.

FIG. 3 illustrates a method 300 of operating the telematics unit in a fringe region of an LTE network according to one illustrative power management scheme or plan. It should be appreciated that this is merely an example; other communication protocols may be used also (e.g., CDMA, WCDMA, GSM, etc.). The method begins with step 310 where the telematics unit 30 is configured for a power-saving mode. This configuration may be made by a vehicle manufacturer at or near the time of the telematics unit's assembly or after-market (e.g., via vehicle download using the afore-described communication system 10 or at a time of vehicle service, just to name a couple of examples). In at least one implementation, one or more instructions are provided to the telematics unit and stored on non-transitory computer-readable medium (e.g., on memory 54).

Step 310 may include preconfiguring one or more parameters. For example, one parameter may be a predetermined threshold signal strength value for comparison with the strength of any incoming or received signals. This value may be an RSSI value, an RSRP value, or any other suitable parameter—this includes but is not limited to any signal quality measure or metric and/or even one or more co-channel interference signal strengths. In the illustrative LTE method of FIG. 3, the RSRP value may be a threshold of −107 dBm, as described above. Other parameters may also be configured. For example, a listening portion (L) of 10 ms, a total time cycle of 200 ms—both configured for an LTE DRx listening mode. In addition, a scanning portion (S) duration may be determined. Other parameters may include various maximum values associated with one or more counters—e.g., a maximum value associated with the number of times a strong-signal is received and lost during a predetermined period of time (e.g., a time segment of the power budget duration). Of course, these values are merely examples and other values are possible. Furthermore, skilled artisans will appreciate other preconfigured or predetermined parameters.

Step 310 also may include application software that utilizes the preconfigured parameters, as well as the data received or collected when the vehicle 12 is unpowered and in a fringe region 260, 270. The software may be configured to identify that the vehicle is within a fringe region and thereafter adjust the amount of power consumed by the NAD 50 in this region in order to maintain the vehicle power budget—e.g., to enable operation of the NAD to consume no more than a predetermined amount of power (e.g., 1440 mAh) during a predetermined duration (e.g., 10 days). This may include identifying that the vehicle is repetitively entering and exiting the DRx listening mode. This may further include identifying the rate of power consumption (e.g., that after 25% of the predetermined duration has occurred, more than 25% of the predetermined amount of power has been consumed). Thus, the application software: may alter the DRx listening mode when the signal strength is stronger so that listening portions (L) are shorter or that time cycles (T) are longer; or may alter the scanning portions (S) so that they are shorter in duration or occur less frequently; or may adjust any other duration of NAD sleep time in order to meet the power budget. This software may apply a flexible or situational approach—so that if perchance network changes or environmental changes occur during the unpowered vehicle state, the software can maximize network connectivity while still consuming the predetermined amount of power for the full extent of the predetermined duration.

The method may then proceed to step 320 where the telematics unit 30 may determine that the vehicle 12 is unpowered or powered OFF. This may include determining that the vehicle engine OFF, that the vehicle is OFF and the vehicle is isolated from a charging station (in the case of electric vehicles), or any other suitable circumstance where the vehicle is OFF and the vehicle battery is not being powered or charged. One of the VSMs 42, such as the ECM, may provide an indication of the OFF state to the telematics unit 30.

Thereafter, the method 300 may proceed to step 330 where the telematics unit 30 may determine whether the vehicle 12 is within a fringe region of a wireless network. As previously described, this may include determining the strength of a wireless or cellular signal and determining that the signal strength intermittently varies less than and greater than a predetermined RSSI (or RSRP) threshold value. It may further include determining the frequency of these variances, as well as the durations of signal strength less than the threshold and greater than the threshold. And, as described above, other factors may be accounted for as well.

In step 340, the telematics unit may enter a power-saving mode based on the vehicle being unpowered and the identification of being in the fringe region. The power saving mode may be a setting based on a determination of the software application; i.e., provided sufficient fringe criteria are determined, the application software commands or provides an instruction to the NAD 50 and/or other electronics to sleep or shut down according to a modified power management scheme.

In the power-saving mode, the telematics unit 30 may still occasionally redetermine or revalidate the vehicle's presence within the fringe region (step 350). This re-determining step may or may not be periodic.

After step 350, the method 300 may proceed to step 360 where the telematics unit 30 exits the power-saving mode. This may occur for various reasons. For example, the vehicle may be powered ON (e.g., vehicle ignition started, an electric vehicle may be plugged into a power source, etc.). If the vehicle 12 is powered again, the method may proceed to step 320 again. Thereafter, the method may repeat steps 320, 330, 340, 350, and 360 (and as described below, step 370).

Another reason the telematics unit 30 may exit the power-saving mode in step 360 may be that the duration of the power budget has expired; in our example, the vehicle has been powered off for 10 hours. In this case, the method may proceed to step 370 and the telematics unit may turn off or power down. Thus, if this occurs no additional listening or scanning will occur until the vehicle is powered on again. Thus, the method may thereafter simply end or ultimately go to step 320 and repeat as described above.

The power management scheme and application software (or any of the methods described herein) may be implemented as one or more computer programs executable by one or more computing devices of or in communication with a vehicle telematics system to cause the system and/or the computing device(s) to perform the method, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the methods may be at least partially performed by any electronic device(s) capable of executing the above-described functions.

For example, processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software application or firmware programs stored in memory 54, which enable the telematics unit to provide a wide variety of services. For instance, processor 52 can execute programs or process data to carry out at least a part of the method discussed herein.

Thus, there has been described a power-saving mode and a power management method for a telematics unit. The power-saving mode may enable the telematics unit to be operative for the duration of a predetermined time period and ensure that the telematics unit does not excessively drain the vehicle battery's power while the vehicle is OFF in a fringe region of wireless network coverage. It should be appreciated that the system and method described herein may be used in implementations other than a vehicle.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of power management of a telematics unit in a vehicle, comprising the steps of:
   (a) determining that the vehicle is unpowered;
   (b) entering a first power-saving mode at the telematics unit, wherein the telematics unit scans periodically for a cellular signal in the first mode, and wherein the telematics unit increases a scan period from a baseline scan period in response to a determination that the cellular signal is below a predetermined signal strength threshold, and resets the scan period to the baseline scan period when the cellular signal is determined to be above the predetermined signal strength threshold;
   (c) determining that the vehicle is in a signal fluctuation region of a cellular network, including determining that the strength of a cellular signal from the network intermittently varies greater than and less than the predetermined signal strength threshold such that the resetting of the scan period in response to the determination that the cellular signal is above the predetermined signal strength threshold while in the first power-saving mode would consume a power budget before the expiration of a predetermined time duration; and
   (d) based on steps (a), (b), and (c), meeting the power budget by entering a second power-saving mode at the telematics unit, wherein the telematics unit reduces power consumption by reducing cellular network usage, and continues the reduced cellular network usage when the signal strength of the cellular network in the signal fluctuation region is detected above the signal strength threshold.

2. The method of claim 1, wherein the intermittent variance occurs within a predetermined duration of time.

3. The method of claim 1, wherein the threshold is greater than or equal to −107 dBm in an LTE cellular network, greater than or equal to −105 dBm in a WCDMA cellular network, and greater than or equal to −105 dBm in a GSM cellular network.

4. The method of claim 1, further comprising step (e) exiting the second power-saving mode if it is determined that the vehicle engine is turned ON or if a predetermined portion of the vehicle power budget has expired.

5. The method of claim 4, wherein the power budget is 1440 milli-Amp-hours (mAh) and the predetermined time duration is 240 hours.

6. A method of claim 1, further comprising configuring a telematics unit with a software application carried by a non-transitory computer medium prior to steps (a), (b), and (c).

7. The method of claim 1, wherein the signal fluctuation region is at or near an outer edge of a cellular region.

8. The method of claim 1, wherein the signal fluctuation region is within a cellular region, the fluctuating signal being due to an obstruction of at least some portion of the cellular signal.

9. A vehicle telematics unit, comprising:
a processor; and
a non-transitory computer readable medium having a network access device (NAD), comprising one or more software application programs stored on the computer readable medium to be executed by the processor, the programs including instructions to:
identify instances when the vehicle is in an unpowered state, wherein the NAD enters a power-saving mode, wherein the NAD scans periodically for a cellular signal in the power-saving mode, and wherein the NAD increases a scan period from a baseline scan period in response to a determination that the cellular signal is below a predetermined signal strength threshold, and resets the scan period to the baseline scan period when the cellular signal is determined to be above the predetermined signal strength threshold;
determine that the wireless signal received by the NAD is a fluctuating signal, wherein the strength of a cellular signal from the network intermittently varies greater than and less than the predetermined signal strength threshold such that the resetting of the scan period in response to the determination that the cellular signal is above the predetermined signal strength threshold while in the power-saving mode would consume a power budget before the expiration of a predetermined time duration; and,
based on the identify and determine instructions, meet the power budget by altering the power-saving mode to modify a listening mode of the NAD to limit the power consumed by the telematics unit so that the telematics unit may be intermittently powerable throughout the duration of a predetermined vehicle power budget and maintain the modified listening mode when the signal strength signal of the cellular network in the signal fluctuation region is detected above the signal strength threshold.

10. The method of claim 1, further comprising step (e) exiting the second power-saving mode and ceasing cellular network usage until the vehicle is powered ON if it is determined that a predetermined duration of a vehicle power budget has expired.

11. The method of claim 10, wherein the power budget is 1440 milli-Amp-hours (mAh) and the predetermined time duration is 240 hours.

12. The method of claim 1, further comprising altering at least one of a listening portion, a scanning portion, and a time cycle of the telematics unit in response to determining that the vehicle is in the signal fluctuation region of the cellular network.

13. The method of claim 1, further comprising shortening a listening portion of a time cycle of the telematics unit in response to determining that the vehicle is in the signal fluctuation region of the cellular network.

14. The method of claim 1, further comprising increasing a time cycle of the telematics unit in response to determining that the vehicle is in the signal fluctuation region of the cellular network.

15. The method of claim 1, further comprising scanning for a cellular signal less frequently in response to determining that the vehicle is in the signal fluctuation region of the cellular network.

16. A method of power management of a telematics unit in a vehicle, comprising the steps of:
(a) determining that the vehicle is unpowered;
(b) entering a first power-saving mode at the telematics unit, including scanning for a cellular signal periodically with the telematics unit, wherein the telematics unit increases a scan period from a baseline scan period in response to a determination that the cellular signal is below a predetermined signal strength threshold, and resets the scan period to the baseline scan period when the cellular signal is above the predetermined signal strength threshold;
(c) determining that the vehicle is in a signal fluctuation region of a cellular network, wherein a signal strength of the cellular network is varying above and below the signal strength threshold such that the resetting of the scan period in response to the determination that the cellular signal is above the predetermined signal strength threshold while in the first power-saving mode would consume a power budget before the expiration of a predetermined time duration; and
(d) based on steps (a) and (c), meeting the power budget by entering a second power-saving mode at the telematics unit, wherein the telematics unit scans for a cellular signal less frequently and continues to scan less frequently when the signal strength of the cellular network in the signal fluctuation region is detected above the signal strength threshold.

17. The method of claim 16, further comprising, after steps (c) and (d):
(e) detecting that the vehicle is not within a signal fluctuation region of the cellular network, and increasing a scan frequency in response to the detection when the signal strength of the cellular network is detected above the signal strength threshold.

18. The method of claim 16, wherein the signal fluctuation region is at or near an outer edge of a cellular region.

19. The method of claim 16, wherein the signal fluctuation region is within a cellular region, the fluctuating signal being due to an obstruction of at least some portion of the cellular signal.

* * * * *